US008522725B1

(12) United States Patent
Moore

(10) Patent No.: US 8,522,725 B1
(45) Date of Patent: Sep. 3, 2013

(54) RETRIEVING TOOL FOR TRAINING DOGS

(75) Inventor: Jeremy Frank Moore, Pulaski, WI (US)

(73) Assignee: Moore Outdoors Productions and Products, Pulaski, WI (US)

( * ) Notice: Subject to any disclaimer, the term of this patent is extended or adjusted under 35 U.S.C. 154(b) by 44 days.

(21) Appl. No.: 12/779,387

(22) Filed: May 13, 2010

Related U.S. Application Data

(60) Provisional application No. 61/178,694, filed on May 15, 2009.

(51) Int. Cl.
*A01K 29/00* (2006.01)
(52) U.S. Cl.
USPC ............................................ 119/711; 119/707
(58) Field of Classification Search
USPC ................... 119/702, 711, 706–710
See application file for complete search history.

(56) References Cited

U.S. PATENT DOCUMENTS

| | | | |
|---|---|---|---|
| 745,806 A * | 12/1903 | Erb | 119/707 |
| D309,120 S * | 7/1990 | Stewart | D10/119.1 |
| D309,121 S * | 7/1990 | Stewart | D10/116.1 |
| 5,555,664 A * | 9/1996 | Shockley | 43/1 |
| 5,706,762 A | 1/1998 | Dokken | |
| 5,826,364 A * | 10/1998 | Bitting | 43/2 |
| 6,360,693 B1 * | 3/2002 | Long, III | 119/707 |
| 6,681,721 B1 | 1/2004 | Buschy | |
| D636,540 S * | 4/2011 | McCann | D30/160 |
| 2005/0153359 A1* | 7/2005 | Schaefer et al. | 435/7.1 |
| 2012/0090557 A1* | 4/2012 | Slade, Jr. | 119/712 |

OTHER PUBLICATIONS

Jeanneney, Training a Dog to Find Shed Antlers, DCA Newsletter Mar. 2006, Retrieved from internet: Sep. 19, 2011.*
Bill McCarthy, Antler hunting facing regulations, Mar. 29, 2008.*
G-BOW Hunting Solutions; With G-BOW, experiance the power of powder!, Sep. 7, 2008.*
Invisatrax, Do Synthetic Deer Scents Work Better Then Real???, Nov. 2006.*

* cited by examiner

*Primary Examiner* — Kristen C Hayes
(74) *Attorney, Agent, or Firm* — Boyle Fredrickson, S.C.

(57) ABSTRACT

A retrieving tool including a retrieving dummy and/or a kit incorporating the same is provided that facilitates training a dog or puppy to find and/or retrieve antlers that were shed by antler bearing animals. The retrieving dummy is shaped to resemble a naturally grown antler and emits an antler scent. A scent carrier may be applied to the retrieving dummy, to allow the retrieving dummy to emit such antler scent. The kit may further include a second retrieving dummy that is less similar in shape, texture, hardness or feel, to a naturally grown antler than the first, and a scent intensity of the antler scent may be varied with use of the one or more retrieving dummies so as to allow for incremental or gradual introduction of the shape, feel, and/or scent of naturally grown antlers to the dog or puppy being trained.

13 Claims, 3 Drawing Sheets

RETRIEVING TOOL FOR TRAINING DOGS

CROSS-REFERENCE TO RELATED APPLICATIONS

This application claims priority from U.S. Provisional Patent Application Ser. No. 61/178,694 filed on May 15, 2009, the entirety of which is expressly incorporated by reference herein.

BACKGROUND OF THE INVENTION

1. Field of the Invention

The invention relates to dog training devices and, more particularly, to retrieving dummies that are used for training dogs to retrieve objects.

2. Discussion of the Related Art

Retrieving tools and dummies that are used for training dogs to retrieve game animal carcasses are known in the hunting industries. Various training tools are also used for training dogs to track and trail live game animals, for example, raccoon, fox, and coyote.

It is also known for hunters and/or other outdoor enthusiasts (collectively referred to hereinafter as "hunters" for the sake of brevity) to collect shed antlers of antler-bearing animals to display or otherwise enjoy. Hunters occasionally find shed antlers, by happenstance, when they are walking through and scouting their hunting lands. Some will purposely look for shed antlers while looking for other signs that can indicate game animal presence while scouting, or may even look for shed antlers as a primary objective of an outing. Regardless, hunters have a very difficult time finding shed antlers because they must rely on eyesight alone (or substantially alone) to find the shed antlers. However, the shed antlers are often partially or totally covered by vegetation or otherwise camouflaged with respect to their surroundings which can make seeing them very difficult. Even though it is desirable to find a matched set of shed antlers from a single animal, if a hunter finds a single shed antler, finding the corresponding second shed antler from the matching pair of antlers of the same animal can prove even more difficult, since it is rare for an antlered animal to shed both of its antlers at the exact same time and in the exact same location.

Many hunters have dogs, such as those mentioned above, which are highly trained for retrieving game animal carcasses or tracking and trailing live animals, and take their dogs with them on scouting or "shed antler finding" trips to the field. However, such dogs are of little, if any, help at finding shed antlers. Shed antlers have different shapes, feels, and scents than those which the dogs focus on in the field.

SUMMARY OF THE INVENTION

In light of the foregoing, a retrieving dummy that can be used as a training aid or tool for training dogs is desired that improves the state of the art by overcoming one or more of the aforesaid problems of the prior art.

In accordance with an aspect of the invention, at least one of these desires is fulfilled by providing a retrieving dummy for training a dog to retrieve a shed antler. The retrieving dummy includes a dummy body and a scent carrier that emits an antler scent which is provided on the dummy body. Providing an antler scent-emitting scent carrier onto the retrieving dummy makes such dummy detectable by smelling activity of a dog.

In accordance with another aspect of the invention, the dummy body is configured to resemble an antler. The dummy body may include (i) a base, (ii) a main beam extending from the base, and (iii) at least one tine extending from the main beam. This configuration allows the dummy body to resemble a shed antler of any of a variety of animals that naturally grow antlers, such as members of the deer or Cervidae family.

In accordance with another aspect of the invention, the base of the dummy body may include a pedicle, resembling a pedicle of a naturally grown antler. The pedicle may be configured to receive and hold the scent carrier.

In accordance with another aspect of the invention, the pedicle may be made entirely from an absorbent material or the pedicle may include an absorbent material portion, the absorbent material portion holding the scent carrier therein or thereon. The absorbent material may be porous, and may be made from at least one of a dense foam material, a felt material, a non-felt fabric material, and a sponge material.

In accordance with another aspect of the invention, the retrieving dummy includes a handle that a user can grasp to enhance throwing performance and to provide a structure that the user can grasp without having to directly grasp the retrieving dummy and correspondingly reducing an amount of the user's own smell that it transferred to the retrieving dummy body. The handle may be a rope extending from the base of the dummy body, for example, a rope that extends longitudinally from a pedicle of the dummy body base.

In accordance with another aspect of the invention, the retrieving dummy may be part of a kit for training a dog to retrieve shed antlers. The kit can include one or more dummy bodies and one or more scent carriers that emit antler scents. At least one of the dummy bodies can resemble an antler, while the kit may include one or more other dummy bodies that either do not resemble an antler or resemble an antler to a relatively lesser extent for incrementally introducing a dog being trained to shapes and configurations that are commensurate with known antler shapes and configurations.

In accordance with another aspect of the invention, the scent carrier may be embodied in at least one of gas form, a liquid form, a powder form, and/or a paste form. The scent carrier is made from one or more synthetic materials, and/or one or more organic materials.

In accordance with another aspect of the invention, the scent carrier includes at least one of a crushed natural antler component, a pulverized natural antler component, and a powdered natural antler component. The scent carrier may also include animal blood and/or animal hair.

In accordance with another aspect of the invention, antler scents are utilized that have different scent intensities. This may be achieved by applying different amounts of the same scent carrier to dummy bodies, to create the differing scent intensities, and/or different scent carriers may themselves define different scent intensities.

In accordance with another aspect of the invention, a method is provided for training a dog to retrieve a shed antler. The method includes applying a first application of a scent carrier to a dummy body so as to provide the dummy body with an antler scent having a first scent intensity, then allowing the dog to locate the dummy body through smelling activity. A second application of a scent carrier is applied to the dummy body, providing the dummy body with an antler scent having a second scent intensity that is less intensity that the first scent intensity and the dog is again allowed to locate the dummy body through smelling activity.

In accordance with another aspect of the invention, a tool, a retrieving dummy or other product, or a kit of such products or devices is provided that can be used to introduce a dog or puppy to the shape, feel, and/or scent of an antler in order to train them to locate and retrieve shed antlers by sight and scent in a natural setting. Such introduction to the shape, feel, and/or scent can be done incrementally or gradually, in a manner that facilitates incremental positive training of the dog or puppy.

Various other features, embodiments, and alternatives of the present invention will be made apparent from the following detailed description taken together with the drawings. It should be understood, however, that the detailed description and specific examples, while indicating preferred embodiments of the invention, are given by way of illustration and not limitation. Many changes and modifications could be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Figure 1:
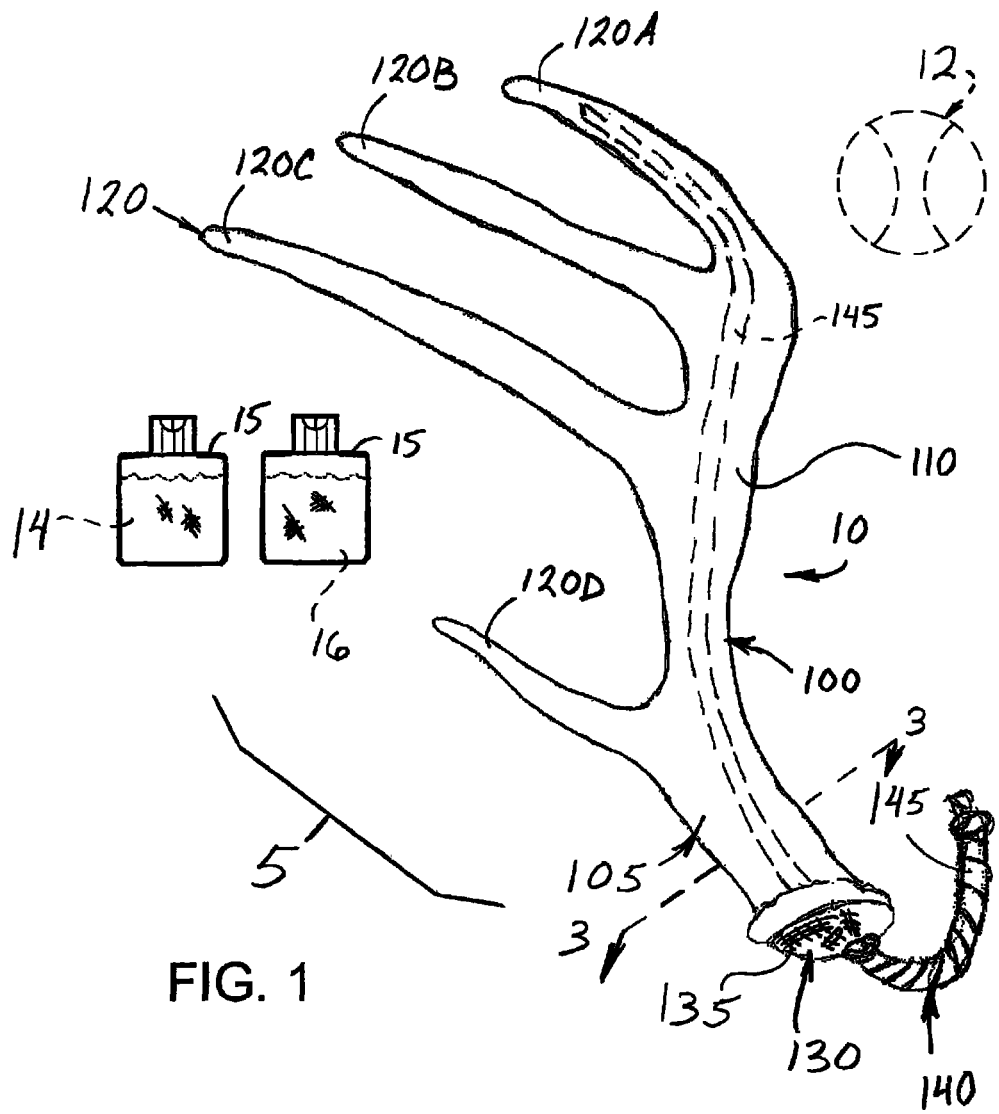
FIG. 1 is a partially schematic front elevation view of a retrieving dummy kit usable as a training tool in accordance to the present invention.

Referring initially to FIG. 1, the drawings illustrate an exemplary embodiment of a dog (or puppy, hereinafter referred to collectively as "dog" for the sake of brevity), training tool or system of the invention, shown as a retrieving dummy kit 5 having retrieving dummies 10, 12 and scent carriers 14, 16. Kit 5 is configured to help train a dog to retrieve shed antlers by incrementally or gradually introducing the dog to the shape, feel, and/or scent of an antler which is explained in greater detail elsewhere herein.

Figure 2:
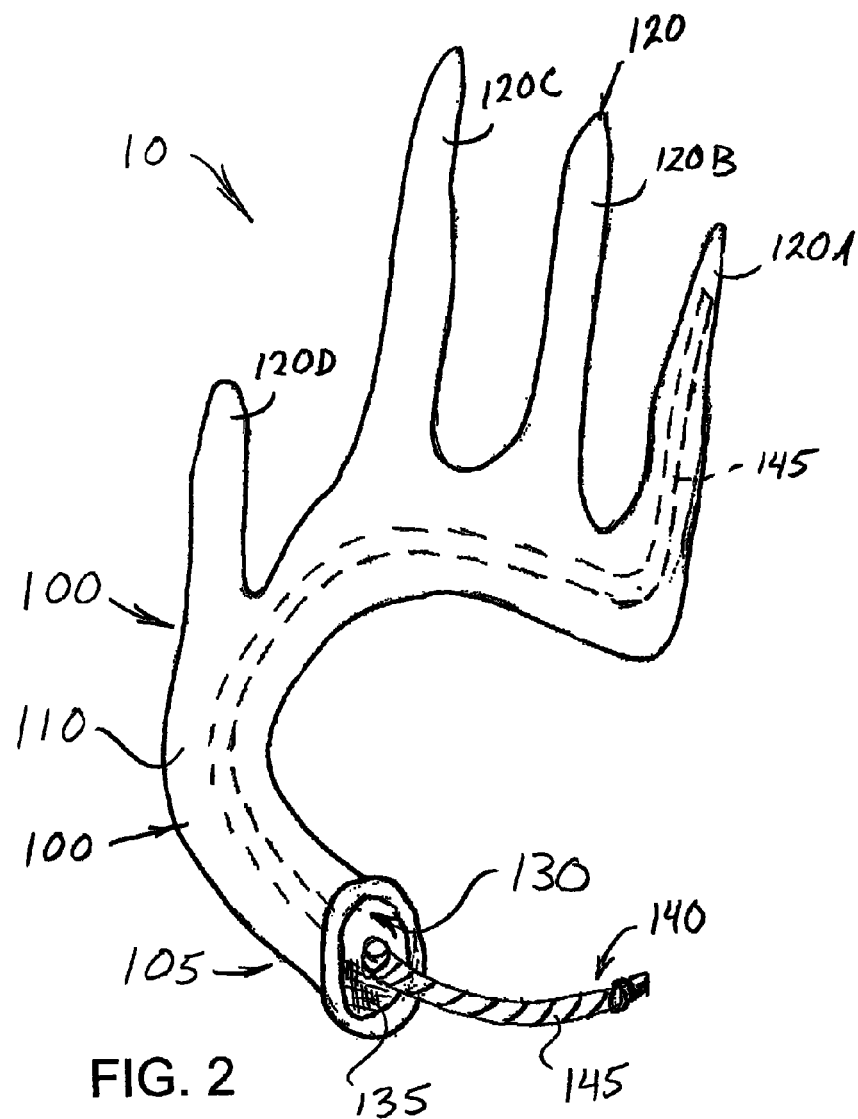
FIG. 2 is a bottom plan view of the retrieving dummy resembling a shed antler of FIG. 1.

Referring now to FIGS. 1 and 2, retrieving dummy 10 includes a dummy body 100 that is configured to resemble an antler that is naturally grown by an antler bearing animal, such as, for example, of any of a variety of members of the deer or Cervidae family. Dummy body 100 of this embodiment includes a base 105 that generally defines a bottom portion of the dummy body 100.

A main beam 110 extends arcuately from the base 105 toward a top portion of the dummy body 100. The base 105 and main beam 110 have gradually reducing width dimensions along their lengths, so that the base 105 and main beam 110 get thinner as they extend toward the top portion of the dummy body 100. At least one tine 120 extends from the main beam 110. The tines 120A, 120B, 120C, 120D of this embodiment are spaced from each other along the length of the main beam 110, extending generally parallel to each other and angularly away from the main beam 110.

A pedicle 130 extends downwardly from the base 105. The pedicle 130 has a curved outer surface, defining a generally hemispherical projection from the base 105. The pedicle 130 of this embodiment is configured to receive and hold the scent carrier 14, 16 thereon, noting that in some embodiments, other portions of the dummy body 100 are configured to receive and hold the scent carrier 14, 16.

Figure 3:
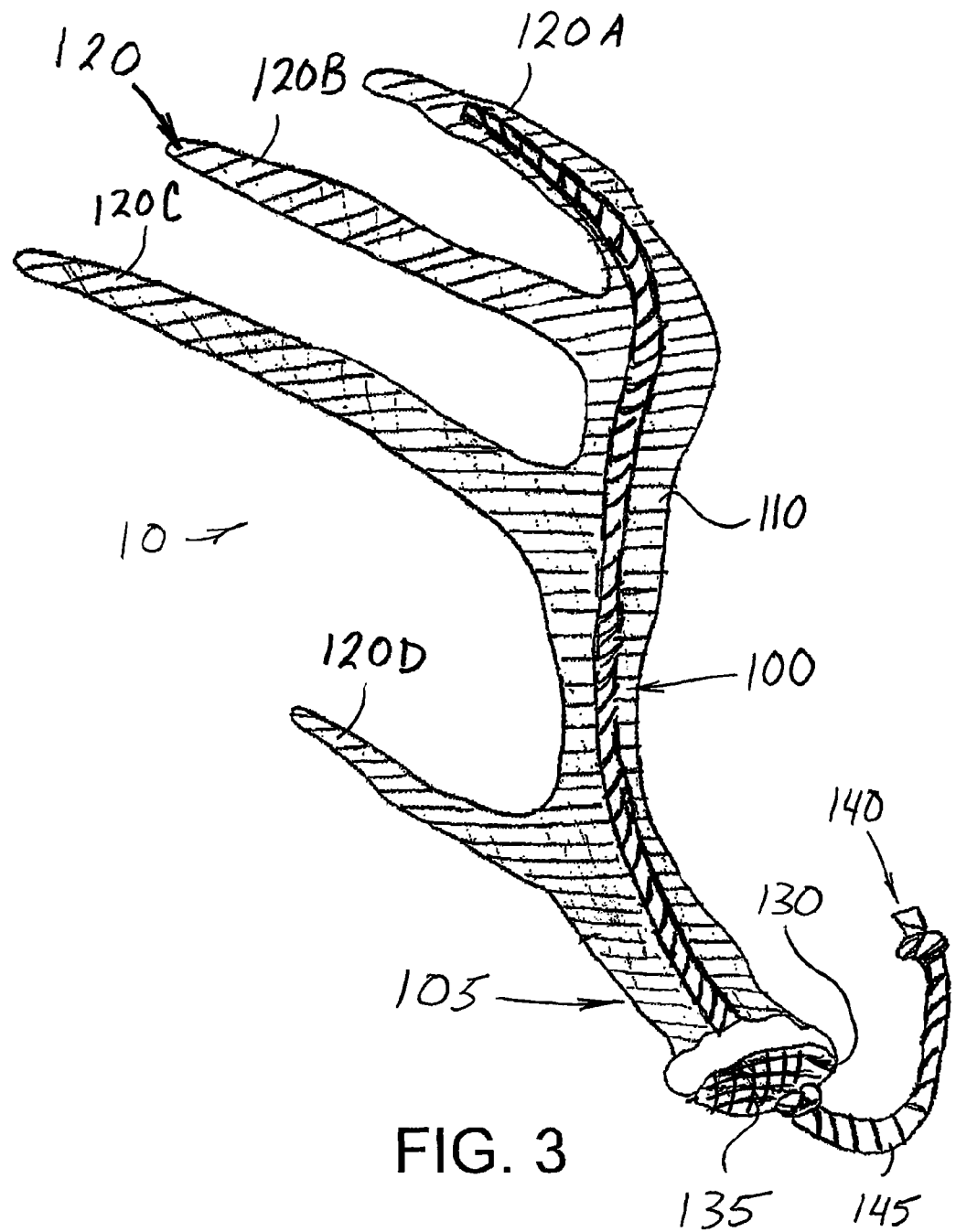
FIG. 3 is a cross-sectional view of the retrieving dummy resembling a shed antler of FIG. 1, taken at 3-3.

Referring now to FIGS. 1-3, pedicle 130 of this embodiment is at least partially made from an absorbent material 135, allowing the absorbent material 135 to hold the scent carrier 14, 16 therein or thereon. The absorbent material 135 may be porous (FIG. 3), and may be made from at least one of a dense-foam material, a felt material, a non-felt fabric material, a sponge material, and/or other suitable natural or synthetic materials.

Still referring to FIGS. 1-3, a handle 140 is provided that provides a gripping or grasping structure with which the user can throw the dummy body 100. Handle 140 is configured to enhance throwing performance and to provide a structure that the user can grasp without having to directly grasp the dummy body 100 and correspondingly reducing an amount of the user's own smell that is transferred to the dummy body 100. The handle 140 of this embodiment includes a rope 145 that extends from the base 105 of the dummy body 100, generally longitudinally from the pedicle 130.

Referring now to FIG. 3, the rope 145 preferably extends inside of and along nearly an entire length of the dummy body 100, for example, more than half way or more than three-quarters of the way through the dummy body 100. Rope 145 of this embodiment extends entirely through the lengths of the base 105 and main beam 110, and through more than half of the length of tine 120A. Rope 145 is preferably mounted in the dummy body 100 during a casting, molding, or other manufacturing procedure through which the dummy body 100 is made. For example, the dummy body 100 can be cast from a reusable, substantially permanent antler mold, which is made by carving or otherwise forming a desired shape impression or void, including impressions and voids that correspond to desired outer surface textures or finishes, into a suitable mold substrate material and into which the particular blend of foamed cellular or other polymeric or elastomeric materials that are used for creating the dummy body 100 are introduced. The rope 145 can be placed into the mold before such active casting or molding procedure, such that the rope 145 is incorporated into the dummy body 100 by the materials of the dummy body 100 flowing and setting around it.

Referring again to FIG. 1, regardless of the particular configuration and location of handle 140, it preferably allows a user to grasp and throw the retrieving dummy 10 without handling the portion of the dummy body 100 that has scent carrier 14, 16 applied to it. The scent carrier 14, 16 can be in any of a variety of suitable forms, including one or more of a gas form, a liquid form, a powder form, and/or a paste form. Scent carrier 14, 16 is housed in a container 15 that corresponds to the particular form of the scent carrier 14, 16. Container 15 in this embodiment is configured for, e.g., a liquid form scent carrier 14, 16 and is a plastic bottle that can be squeezed to dispense the scent carrier 14, 16 onto the dummy body 100.

Referring still to FIG. 1, regardless of the particular form that the scent carrier 14, 16 has, after the scent carrier 14, 16 is applied to the retrieving dummy 10, 12, whereby the retrieving dummy 10, 12 emits an antler scent that corresponds to scents or odors of naturally grown and shed antlers. The scent carrier 14, 16 is made from one or more synthetic materials, and/or one or more organic materials, depending on the particular desired end-use configuration. Scent carrier 14, 16 of some embodiments is made from chemical compositions that correspond to constituents of naturally grown antlers. Other embodiments of scent carrier 14, 16 include at least one of a crushed natural antler component, a pulverized natural antler component, and a powdered natural antler component, as well as, for example, animal blood and/or animal hair in addition to or in lieu of the natural antler components.

Still referring to FIG. 1, in this embodiment, the scent carriers 14, 16 have different strengths or scent intensities, scent 14 having a greater scent intensity and therefore being easier for dogs to smell than scent carrier 16. This can be achieved by providing more or a greater concentration of the active ingredient or natural antler component in scent carrier 14 than in scent carrier 16. By choosing which of the scent carriers 14, 16 to apply to retrieving dummy 10, 12, a user can determine the relative sent intensity that the retrieving dummy 10, 12 will present for the dog to detect by its smelling activity. Notwithstanding, varying scent intensity of the retrieving dummy 10, 12 can otherwise be achieved by varying the amount of the scent carrier 14, 16 that is applied to the retrieving dummy 10, 12.

Still referring to FIG. 1, by allowing for variation of scent intensity that is emitted by retrieving dummy 10, 12 through the scent carrier 14, 16 and/or relative amount of the scent carrier 14, 16 applied to the retrieving dummy 10, 12, a user can incrementally introduce the dog to the scent of a naturally grown antler. The retrieving dummies 10, 12, can be configured to gradually introduce the dog to the shape and feel of a naturally grown antler. This can be achieved by configuring the dummy 12 to be similar to something that the dog is already familiar with, seen in this embodiment as a tennis ball-type of configuration, whereas the dummy body 100 of retrieving dummy 10 resembles a naturally grown antler as explained in greater detail elsewhere herein. Retrieving dummy 12 can assume yet other forms, which are not illustrated, but which have shapes that are either relatively more familiar to the dog or resemble a naturally grown antler to a lesser extent than does the retrieving dummy 10.

In light of the above, to use kit 5, the dog can be first introduced to the scent of a naturally grown antler using a retrieving dummy 12 that has a shape which is at least somewhat familiar to the dog, or at least resembles a naturally grown antler to a relatively small extent. When the dog grows accustomed to such antler scent, the retrieving dummy 12 may be used in training field work using a high scent intensity application of the scent carrier 14, 16, making it relatively easy for the dog to find the retrieving dummy 12 by using its smelling activity. The intensity of the antler scent can be decreased over time, making it more challenging for the dog to find the retrieving dummy 12. At some point during or after the training with retrieving dummy 12, the dog is introduced to the retrieving dummy 10 or some intermediate dummy (not shown) that has a shape which is more similar to a naturally grown antler than retrieving dummy 12 but less similar that retrieving dummy 10. Here again, scent carriers 14, 16 are used to vary the scent intensity emitted by the retrieving dummy 10, as desired, for making it relatively easier or more difficult for the dog to detect with its smelling activity.

It should be understood, of course, that the foregoing relates to exemplary embodiments of the invention and that modifications may be made without departing from the spirit and scope of the invention as set forth in the following claims.

Various alternatives and embodiments are contemplated as being within the scope of the following claims particularly pointing out and distinctly claiming the subject matter regarded as the invention.

I claim:

1. A retrieving dummy comprising:
a dummy body configured to resemble an antler, wherein the dummy body is formed of a material other than natural antler material, and wherein the dummy body comprises a base having a pedicle, a main beam extending from the base, and at least one tine extending from the main beam;
a scent carrier carried by the dummy body and formed of a material different from that of the dummy body, wherein the scent carrier emits an antler scent such that the retrieving dummy is detectable by smelling activity of a dog, wherein the scent carrier is made from at least one of a crushed natural antler component, a pulverized natural antler component, and a powdered natural antler component such that the antler scent corresponds to a scent of an antler that is naturally grown by an antler bearing animal.

2. The retrieving dummy of claim 1, wherein the pedicle comprises an absorbent material that holds the scent carrier therein.

3. A retrieving dummy comprising:
a dummy body configured to resemble an antler, comprising a base, a main beam extending from the base, and at least one tine extending from the main beam;
a scent carrier emitting an antler scent and being provided on the dummy body such that the retrieving dummy is detectable by smelling activity of a dog, wherein the scent carrier is made from at least one of a crushed natural antler component, a pulverized natural antler component, and a powdered natural antler component such that the antler scent corresponds to a scent of an antler that is naturally grown by an antler bearing animal;
wherein the base includes a pedicle that is configured to receive the antler scent thereon, wherein the pedicle comprises an absorbent material that holds the scent carrier therein, wherein the absorbent material is porous and is made from at least one of a dense-foam material, a felt material, a non-felt fabric material, and a sponge material receiving the scent carrier so that the antler scent is concentrated at the pedicle.

4. A retrieving dummy comprising:
a dummy body configured to resemble an antler, comprising a base, a main beam extending from the base, and at least one tine extending from the main beam;
a scent carrier emitting an antler scent and being provided on the dummy body such that the retrieving dummy is detectable by smelling activity of a dog;
wherein the base includes a pedicle that is configured to receive the antler scent thereon, wherein the pedicle comprises an absorbent material that holds the scent carrier therein, wherein the scent carrier is in at least one of a liquid form, a powder form, and a paste form comprising at least one of a crushed natural antler component, a pulverized natural antler component, and a powdered natural antler component such that the antler scent corresponds to a scent of an antler that is naturally grown by an antler bearing animal.

5. The retrieving dummy of claim 4, wherein the scent carrier is made from one or more synthetic materials.

6. The retrieving dummy of claim 4, wherein the scent carrier is made from one or more organic materials.

7. The retrieving dummy of claim 6, wherein the scent carrier comprises at least one of animal blood and animal hair.

8. A retrieving dummy comprising:
a dummy body configured to resemble an antler, wherein the dummy body is formed of a material other than natural antler material, and wherein the dummy body comprises a base, a main beam extending from the base, and at least one tine extending from the main beam;

a scent carrier carried by the dummy body and formed of a material different from that of the dummy body, wherein the scent carrier emits an antler scent that corresponds to a scent of an antler that is naturally grown by an antler bearing animal such that the retrieving dummy is detectable by smelling activity of a dog; and a handle attached to the dummy body and so that at least a portion of the handle is spaced from the at least a portion of the dummy body provided with the scent carrier.

9. A retrieving dummy comprising:

a dummy body configured to resemble an antler, comprising a base, a main beam extending from the base, and at least one tine extending from the main beam;

a scent carrier emitting an antler scent that corresponds to a scent of an antler that is naturally grown by an antler bearing animal and being provided on at least a portion of the dummy body such that the retrieving dummy is detectable by smelling activity of a dog; and a handle attached to the dummy body, wherein the handle is a rope extending from the base of the dummy body so that at least a portion of the handle is spaced from the at least a portion of the dummy body provided with the scent carrier.

10. The retrieving dummy of claim 9, wherein the base further comprises a pedicle and the rope extends longitudinally from the pedicle.

11. A retrieving dummy kit for training a dog comprising:

a dummy body including a handle portion arranged with respect to the dummy body to facilitate throwing of the dummy body by a hand of a user;

multiple scent carriers emitting antler scents having different scent intensities, wherein each scent carrier emits an antler scent corresponding to a scent of an antler that is naturally grown by an antler bearing animal for applying to the dummy body such that the retrieving dummy can be detected by smelling activity of a dog.

12. The retrieving dummy kit of claim 11, wherein the dummy body is configured to resemble an antler, the dummy body including:

a base;

a main beam extending from the base; and at least one tine extending from the main beam.

13. The retrieving dummy kit of claim 12, wherein each of the multiple scent carriers is made from at least one of a crushed natural antler component, a pulverized natural antler component, and a powdered natural antler component.

* * * * *